United States Patent
Loew et al.

(10) Patent No.: US 9,969,444 B2
(45) Date of Patent: May 15, 2018

(54) VEHICLE CARGO AREA DIVIDER WORK SURFACE

(71) Applicant: FORD GLOBAL TECHNOLOGIES, LLC, Dearborn, MI (US)

(72) Inventors: Pattrick Loew, Dearborn, MI (US); Brian Robert Spahn, Plymouth, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 40 days.

(21) Appl. No.: 15/210,579

(22) Filed: Jul. 14, 2016

(65) Prior Publication Data

US 2018/0015963 A1    Jan. 18, 2018

(51) Int. Cl.
*B62D 33/027*    (2006.01)

(52) U.S. Cl.
CPC ................... *B62D 33/0273* (2013.01)

(58) Field of Classification Search
CPC .................................. B62D 33/0273
USPC ............................... 296/26.08, 57.1
See application file for complete search history.

(56) References Cited

U.S. PATENT DOCUMENTS

| | | | |
|---|---|---|---|
| 2,160,958 A | 6/1939 | Critchlow | |
| 2,228,203 A | 1/1941 | De Hoffman et al. | |
| 5,028,063 A | 7/1991 | Andrews | |
| 5,975,608 A * | 11/1999 | Jarman | B62D 33/037 296/26.11 |
| 6,082,801 A | 7/2000 | Owen et al. | |
| 6,179,360 B1 | 1/2001 | Davian | |
| 6,193,294 B1 * | 2/2001 | Disner | B62D 33/0273 108/44 |
| 6,224,127 B1 | 5/2001 | Hodge | |
| 6,402,215 B1 * | 6/2002 | Leitner | B60P 3/40 296/26.11 |
| 6,454,338 B1 * | 9/2002 | Glickman | B60P 1/435 296/26.1 |
| 6,550,841 B1 * | 4/2003 | Burdon | B60P 3/40 296/26.11 |
| 6,629,807 B2 | 10/2003 | Bernardo | |
| 6,692,055 B2 * | 2/2004 | Schilling | B60P 1/435 296/26.11 |
| 6,712,568 B2 | 3/2004 | Snyder et al. | |
| 6,722,290 B2 | 4/2004 | Wetterlund | |
| 7,021,689 B1 | 4/2006 | Weisbeck, III | |
| 7,234,749 B1 * | 6/2007 | Firzlaff | B62D 33/0273 296/26.08 |
| 7,287,798 B2 * | 10/2007 | King | B60P 3/40 296/180.1 |
| 7,628,439 B1 * | 12/2009 | Strong | B62D 33/0273 108/44 |

(Continued)

FOREIGN PATENT DOCUMENTS

EP    1215107 A1 *  6/2002    ............... B60P 3/40

*Primary Examiner* — Pinel E Romain
(74) *Attorney, Agent, or Firm* — Jason Rogers; King & Schickli PLLC

(57) ABSTRACT

A work surface apparatus for a vehicle includes a tailgate having at least two panel-supporting posts adapted for translating between a stowed position and a substantially horizontal deployed position. A panel is included, configured to be supported in a substantially horizontal orientation by the deployed at least two panel-supporting posts. The panel may be a cargo area divider defined by hingedly connected sections.

18 Claims, 5 Drawing Sheets

(56) References Cited

U.S. PATENT DOCUMENTS

| | | | |
|---|---|---|---|
| 7,712,811 B2* | 5/2010 | Heaman | B62D 33/0273 296/26.08 |
| 8,029,038 B2 | 10/2011 | Woodhouse et al. | |
| 2003/0075943 A1* | 4/2003 | Kirchhoff | B60P 3/14 296/26.11 |
| 2007/0236035 A1* | 10/2007 | Waldner | B62D 33/02 296/26.11 |
| 2010/0001029 A1 | 1/2010 | Tai | |
| 2016/0236724 A1* | 8/2016 | Borges Filho | B62D 33/0273 |

* cited by examiner

VEHICLE CARGO AREA DIVIDER WORK SURFACE

TECHNICAL FIELD

This document relates generally to the motor vehicle field and, more particularly, to a cargo area divider configurable as a work surface attached to a vehicle cargo area.

BACKGROUND

Users often require work surfaces for performing various tasks, and it is highly convenient to the user to have such work surfaces associated with or carried in the vehicle cargo area for use, for example associated with a truck bed. However, storing work surfaces such as tables, sawhorses, etc. in a vehicle cargo area reduces the amount of space usable for carrying other items.

Thus, a need is identified for a vehicle cargo area work surface that can be easily stowed when not in use so as not to occupy otherwise usable cargo area storage space, but which can be rapidly and easily deployed from the stowed configuration for use.

SUMMARY

In accordance with the purposes and benefits described herein, in one aspect, a work surface apparatus for a vehicle is described, comprising a tailgate or liftgate including at least two panel-supporting posts adapted for translating between a stowed position and a substantially horizontal deployed position. A panel is provided, configured to be supported in a substantially horizontal orientation by the deployed at least two panel-supporting posts. In embodiments, the panel is a cargo area divider.

In embodiments, the panel-supporting posts stowed position is within a tailgate interior. In embodiments, the cargo area divider comprises a plurality of hingedly connected sections. The hinges may be lockable to hold the plurality of hingedly connected sections in a folded and/or an unfolded configuration. In embodiments, the panel includes one or more pins or tongues for inserting into one or more cooperating apertures or slots defined in the at least two panel-supporting posts.

In another aspect, a work surface apparatus for a vehicle is described, comprising a tailgate including at least two support posts adapted for translating between a stowed position and a substantially horizontal deployed position and a cargo area divider adapted to define a work surface for holding in a substantially horizontal orientation by the deployed at least two support posts.

In yet another aspect, a vehicle including a work surface apparatus is described, comprising a tailgate comprising at least two support posts adapted for translating between a recessed stowed position and a substantially horizontal deployed position and a folding cargo area divider adapted to be unfolded and locked into a work surface supported in a substantially horizontal orientation by the deployed at least two support posts.

In the following description, there are shown and described several preferred embodiments of the work surface apparatus. As it should be realized, the arrangement is capable of other, different embodiments and its several details are capable of modification in various, obvious aspects all without departing from the truck cargo area extender as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the work surface apparatus and together with the description serve to explain certain principles thereof. In the drawing figures.

Reference will now be made in detail to the present preferred embodiments of the work surface apparatus, examples of which are illustrated in the accompanying drawing figures.

DETAILED DESCRIPTION

Figure 1:
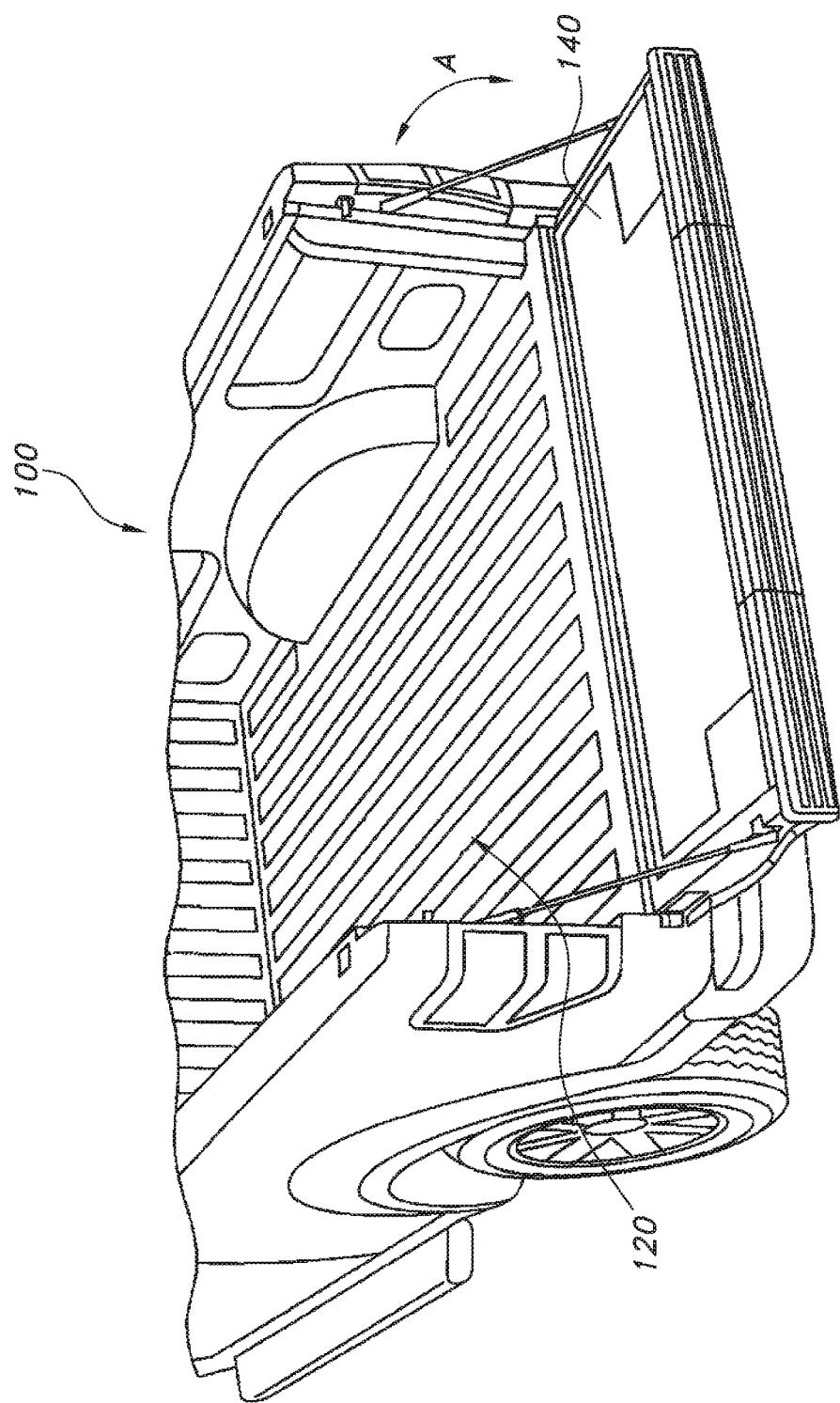
FIG. 1 is a rear view of a vehicle including a hingedly connected tailgate or liftgate.

Reference is now made to FIG. 1, which illustrates a vehicle 100 including a cargo area or bed 120 and a hingedly attached tailgate 140 configured for translating (see arrow A) between a raised, generally vertical closed position and the lowered, generally horizontal open position shown in the drawing. While the illustrated vehicle 100 is a pickup truck, it will be appreciated that other vehicle types include such a tailgate or liftgate, for example sport-utility vehicles, station wagons, and others, and so the vehicle type will not be construed as limiting. The tailgate 140 and cargo area 120 may include a variety of hinged, support, and latching devices which are well known in the art and which do not require extensive discussion herein.

Figure 2A:
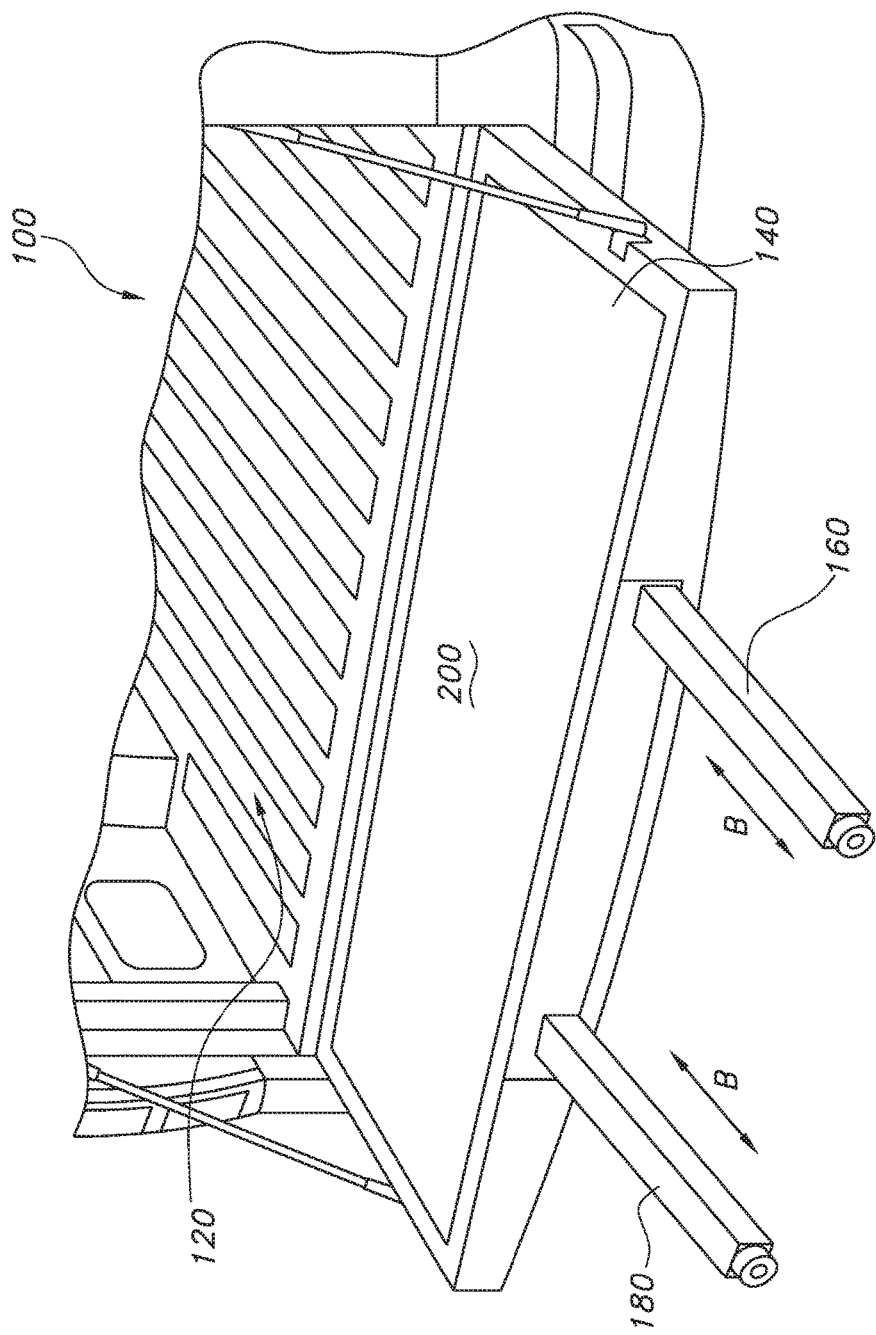
FIG. 2A shows a pair of posts deployed from the lowered tailgate of FIG. 1.
Figure 2B:
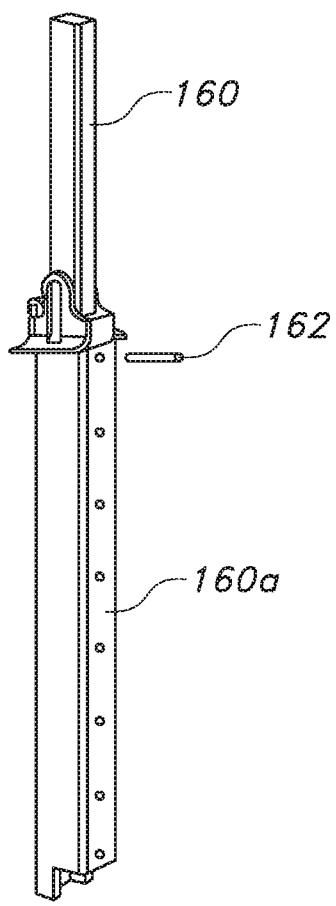
FIG. 2B shows a retracting post mechanism according to the present disclosure.

The tailgate 140 is provided with posts which may be translated between a stowed position and one or more deployed positions. In the embodiment depicted in FIG. 2A, the tailgate 140 is provided with a pair of posts 160, 180 configured for deploying to extend from the lowered tailgate in a generally horizontal orientation, and for retracting back into the stowed position (see arrows B). Of course, additional posts may be added in accordance with the dimensions and/or weight which the posts are required to support. In one possible embodiment (see FIG. 2B), each post 160, 180 (only post 160 is shown for clarity) may include an extendable portion 160a, 180a that telescopes into another member, such as a tubular receiver 160b, 180b, associated with and fixed to the tailgate 140 (not shown in this view). A suitable locking pin 162 may also be provided for locking the posts 160, 180 in the deployed and stowed positions.

In an alternative embodiment, the posts 160, 180 may be configured to be raised into a generally vertical position, and then to be lowered into the generally horizontal position, substantially along a same plane as the lowered tailgate. This may be accomplished by brackets including pivots (embodiment not shown) for securing the posts 160, 180 to the tailgate. One suitable embodiment of such posts is disclosed in detail in U.S. Pat. No. 9,302,719 to Ford Global Technologies, Ltd, the disclosure of which is incorporated herein by reference in its entirety.

Alternatively, the posts 160, 180 may be configured to be stowed in one or more receivers (embodiment not shown) molded or otherwise formed in an inner panel 200 of the tailgate 140, and to be raised to the generally vertical orientation and then to be lowered to the generally horizontal orientation. An exemplary configuration of posts configured to be so stowed/deployed is shown in U.S. Pat. No. 7,090,276, the disclosure of which is incorporated herein by reference in its entirety. The raising/lowering of the posts 160, 180 may be accomplished by use of brackets including pivots. An example of such brackets is disclosed in U.S. Pat. No. 9,302,719. Any number of retainer mechanisms may be used to secure the posts 160, 180 in the desired orientation, including without intending any limitation pins, clips, dogs, and other retainers.

The posts 160, 180 may be held in the suitably configured and dimensioned receivers by a number of mechanisms. The receivers may be dimensioned to hold the posts 160, 180 by a friction or interference fit. Alternatively or in addition, various clips (not shown) may be provided to hold or assist in holding the various components in the receivers. Still further, the posts 160, 180 may be configured for removal from the tailgate 140 and insertion into dedicated brackets or sleeves provided in the tailgate body and/or the tailgate inner panel 200 to respectively hold the posts in one or both of the described generally vertical and generally horizontal orientations, with pins, clips, etc. provided to secure the posts in the brackets or sleeves. All such mechanisms are contemplated for use herein.

Figure 3:
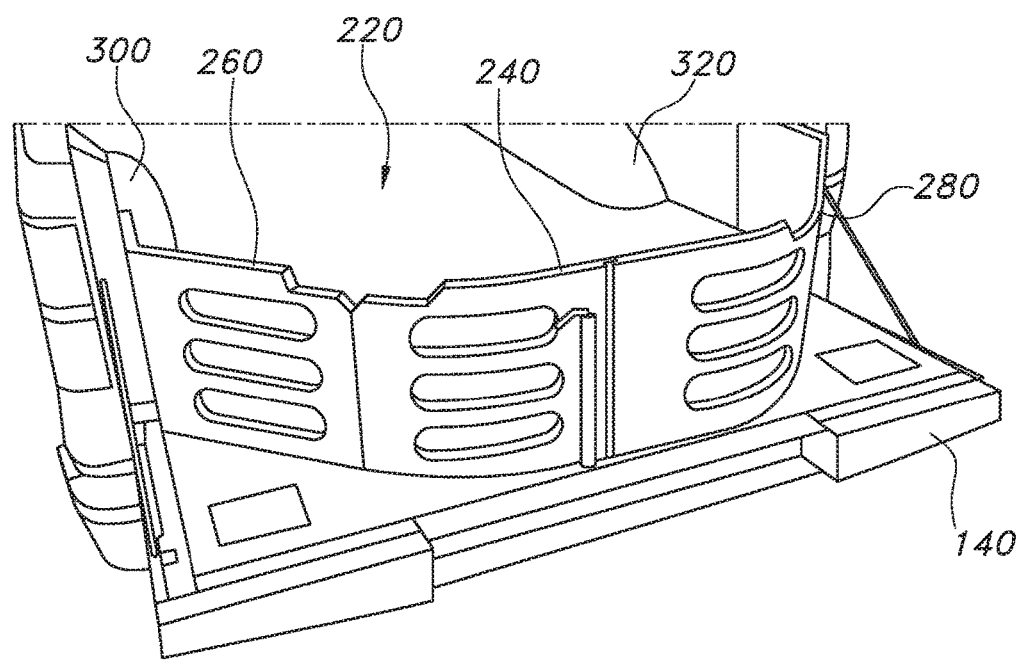
FIG. 3 shows a cargo area divider deployed in a cargo area of the vehicle of FIG. 1.
Figure 5:
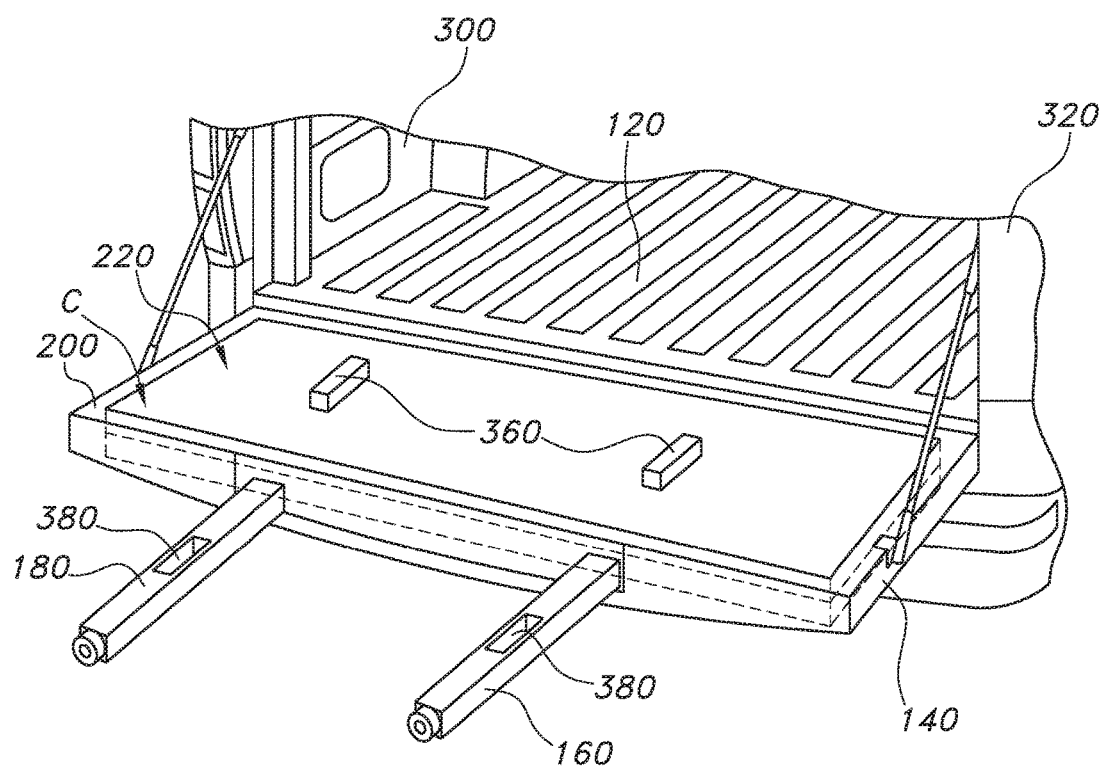
FIG. 5 shows an alternative stowing configuration for the cargo area divider of FIG. 3.

Continuing, with reference to FIG. 3 a cargo area divider 220 is provided, which may be configured in any of a number of suitable configurations. The cargo area divider 220 may be a unitary panel (embodiment not shown). In another embodiment as shown in FIG. 3, a folding cargo area divider 220 is provided. The cargo area divider 220 may include a central panel 240 and a pair of side panels 260, 280 connected to the central panel by suitable hinge structures. The central panel 240 may be divided to allow folding the cargo area divider 220 to a stowed configuration substantially parallel with the inner cargo area sides 300, 320. Alternatively, the cargo area divider 220 may be configured to be stowed in a suitably configured/dimensioned cavity C defined in the tailgate inner panel 200 as shown in FIG. 5.

Figure 4:
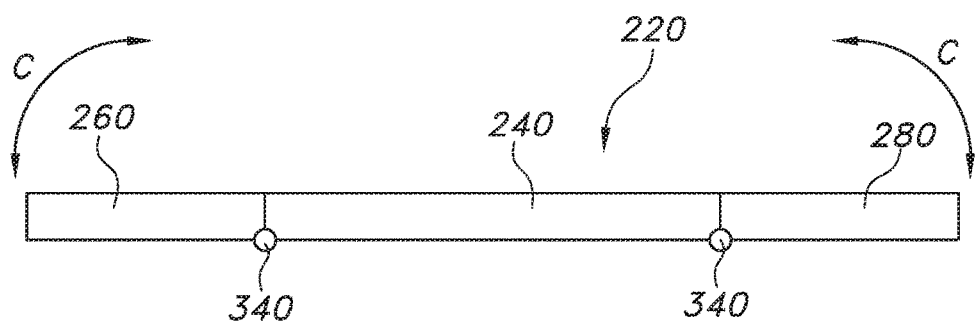
FIG. 4 shows the cargo area divider of FIG. 3 configured for use as a work surface.
Figure 6:
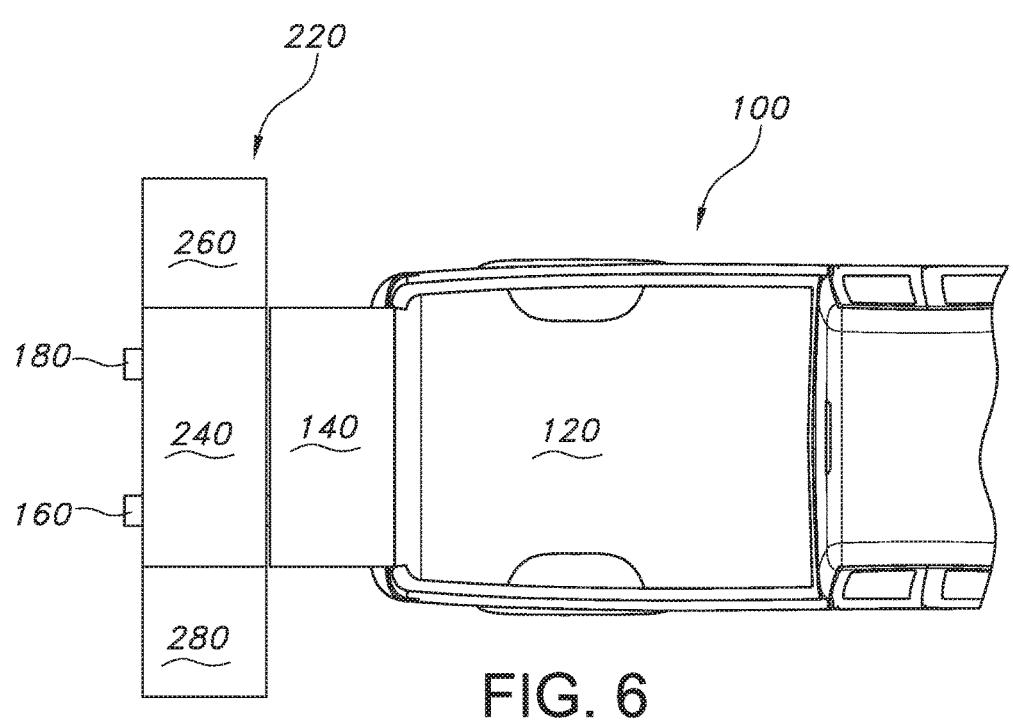
FIG. 6 shows a vehicle including a cargo area divider deployed for use as a work surface according to the present disclosure.

In use as a cargo area divider, the side panels 260, 280 connect to the inner cargo area sides 300, 320 as shown in FIG. 3. In use as a work surface, as shown in FIG. 6 the cargo area divider 220 may be removed from its stowed position, unfolded and locked to form a substantially flat panel, and placed in a substantially transverse and horizontal orientation across the posts 160, 180, thereby providing a convenient work surface. In an embodiment hinges 340 are provided that are 180 degree hinges which provide only a sufficient range of motion (arrows C) to open the folding cargo area divider out to define a flat panel as shown in FIG. 4. The hinges 340 may be lockable to retain the folding cargo area divider 220 respectively in the folded and unfolded configurations. Such hinge mechanisms are well known in the art and do not require substantial discussion herein.

Optionally, the central panel 240 may include tongues or pins 360 which are received in cooperating slots or apertures 380 provided in posts 160, 180 to provide a more secure connection therebetween. Of course, alternative fastening mechanisms are contemplated, including conventional fasteners such as bolts or screws, pin/clip arrangements, and others.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A work surface apparatus for a vehicle, comprising:
    a tailgate including at least two panel-supporting posts adapted for translating between a stowed position and a substantially horizontal deployed position when the tailgate is in a substantially horizontal lowered position; and
    a panel adapted for carrying by the deployed at least two panel-supporting posts and including one or more pins or tongues adapted to be inserted into one or more cooperating apertures or slots defined in the at least two panel-supporting posts.

2. The work surface apparatus of claim 1, wherein the panel is supported in a substantially horizontal orientation by the deployed at least two panel-supporting posts.

3. The work surface apparatus of claim 2, wherein the panel is a cargo area divider.

4. The work surface apparatus of claim 1, wherein the at least two panel-supporting posts are hingedly connected to the tailgate.

5. The work surface apparatus of claim 1, wherein the at least two panel-supporting posts telescope outwardly from the tailgate.

6. The work surface apparatus of claim 3, wherein the cargo area divider comprises a plurality of hingedly connected sections.

7. The work surface apparatus of claim 6, wherein the plurality of hingedly connected sections are provided with one or more lockable hinges for holding the sections in a folded and/or an unfolded configuration.

8. The work surface apparatus of claim 2, wherein the panel is stowed recessed into a portion of the tailgate.

9. A vehicle including the work surface apparatus of claim 1.

10. A work surface apparatus for a vehicle, comprising:
    a tailgate including at least two support posts adapted for translating between a stowed position and a substantially horizontal deployed position; and
    a cargo area divider adapted to define a work surface for holding in a substantially horizontal orientation by the deployed at least two support posts, the cargo area divider including a plurality of pins or tongues adapted for insertion into cooperating apertures or slots defined in the at least two support posts.

11. The work surface apparatus of claim 10, wherein the at least two support posts are hingedly connected to the tailgate.

12. The work surface apparatus of claim 10, wherein the at least two panel-supporting posts telescope outwardly from the tailgate.

13. The work surface apparatus of claim 10, wherein the cargo area divider is stowed in a folded configuration recessed into a portion of the tailgate.

14. A vehicle including the work surface apparatus of claim 10.

15. A vehicle including a work surface apparatus comprising:
- a tailgate or liftgate comprising at least two support posts adapted for translating between a recessed stowed position and a substantially horizontal deployed position; and
- a folding cargo area divider adapted to be unfolded from a stowed position recessed into a portion of the tailgate and locked into a substantially horizontal work surface supported by the deployed at least two support posts;
- wherein the folding cargo area divider includes at least one pin or tongue adapted for insertion into at least one cooperating aperture or slot defined in each of the at least two support posts.

16. The vehicle of claim 15, wherein the at least two support posts are hingedly connected to the tailgate.

17. The vehicle of claim 15, wherein the at least two panel-supporting posts telescope outwardly from the tailgate when in a lowered configuration.

18. The vehicle of claim 15, wherein the folding cargo area divider comprises a plurality of sections connected by one or more lockable 180 degree hinges.

\* \* \* \* \*